(12) United States Patent
Schnitzer (10) Patent No.: US 8,991,862 B2
(45) Date of Patent: Mar. 31, 2015

(54) STEERING COLUMN FOR A MOTOR VEHICLE

(75) Inventor: Rony Schnitzer, Ruggell (LI)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 14/352,451

(22) PCT Filed: Sep. 6, 2012

(86) PCT No.: PCT/EP2012/003739
§ 371 (c)(1),
(2), (4) Date: Apr. 17, 2014

(87) PCT Pub. No.: WO2013/056766
PCT Pub. Date: Apr. 25, 2013

(65) Prior Publication Data
US 2014/0252753 A1   Sep. 11, 2014

(30) Foreign Application Priority Data

Oct. 19, 2011   (DE) .......................... 10 2011 054 595
Dec. 20, 2011  (DE) .......................... 10 2011 056 674

(51) Int. Cl.
*B62D 1/18*       (2006.01)
*B62D 1/184*     (2006.01)

(52) U.S. Cl.
CPC ..................................... *B62D 1/184* (2013.01)
USPC ....................................................... 280/775

(58) Field of Classification Search
USPC .............................. 280/775, 779; 74/492, 493
See application file for complete search history.

(56) References Cited

U.S. PATENT DOCUMENTS

| 5,239,888 A | 8/1993 | Sevault et al. |
| 5,377,555 A | 1/1995 | Hancock |
| 5,730,465 A | 3/1998 | Barton et al. |

(Continued)

FOREIGN PATENT DOCUMENTS

| DE | 696 02 206 | 11/1999 |
| DE | 603 00 128 | 4/2005 |

(Continued)

OTHER PUBLICATIONS

International Search Report (ISR) issued Dec. 13, 2012 in International (PCT) Application No. PCT/EP2012/003739.

*Primary Examiner* — Faye M. Fleming
(74) *Attorney, Agent, or Firm* — Wenderoth, Lind & Ponack, L.L.P.

(57) ABSTRACT

A steering column for a motor vehicle includes a console part for securing the steering column to a body of the motor vehicle, and a steering shaft bearing unit for rotatably mounting a steering shaft of the steering column. The steering shaft bearing unit is mounted between at least two lateral cheeks of the console part. A bearing part is arranged between the lateral cheeks of the console part and the steering shaft bearing unit. A clamping bolt of the steering column penetrates the lateral cheeks of the console part, the bearing part, and the steering shaft bearing unit. The bearing part has at least one bearing part bead, while the steering shaft bearing unit has at least one steering shaft bearing unit bead, at least some areas of the bearing part bead lying flat against the steering shaft bearing unit bead. The clamping bolt penetrates the bearing part in the bearing part bead and penetrates the steering shaft bearing unit in the steering shaft bearing unit bead.

17 Claims, 5 Drawing Sheets

(56) References Cited

U.S. PATENT DOCUMENTS

| | | |
|---|---|---|
| 5,927,152 A | 7/1999 | Marzio et al. |
| 7,350,813 B2 | 4/2008 | Inoue |
| 7,607,694 B2 * | 10/2009 | Shinohara et al. ............ 280/775 |
| 7,735,391 B2 * | 6/2010 | Osawa et al. .................. 74/493 |
| 7,861,615 B2 | 1/2011 | Harris et al. |
| 7,918,483 B2 | 4/2011 | Galehr et al. |
| 8,616,580 B2 | 12/2013 | Maniwa et al. |
| 2002/0084644 A1 * | 7/2002 | Rinker et al. ................. 280/775 |
| 2002/0178857 A1 * | 12/2002 | Matsumiya .................... 74/493 |
| 2005/0016315 A1 * | 1/2005 | Breuss et al. .................. 74/493 |
| 2006/0151984 A1 * | 7/2006 | Higashino et al. ............ 280/775 |
| 2007/0069513 A1 | 3/2007 | Kirihara et al. |
| 2008/0178702 A1 * | 7/2008 | Lutz ............................... 74/493 |
| 2008/0252056 A1 | 10/2008 | Moriyama et al. |
| 2009/0044656 A1 | 2/2009 | Okada et al. |
| 2010/0018340 A1 | 1/2010 | Schnitzer et al. |
| 2010/0282016 A1 | 11/2010 | Oehri et al. |
| 2010/0294072 A1 | 11/2010 | Ishii et al. |
| 2011/0259140 A1 | 10/2011 | Fevre |
| 2012/0297917 A1 | 11/2012 | Mashimo et al. |

FOREIGN PATENT DOCUMENTS

| | | |
|---|---|---|
| DE | 11 2009 000 027 | 8/2010 |
| EP | 0 502 761 | 9/1992 |
| EP | 0 600 700 | 6/1994 |
| EP | 0 770 537 | 5/1997 |
| EP | 1 125 820 | 8/2001 |
| EP | 0 794 103 | 10/2002 |
| EP | 1 359 082 | 11/2003 |
| EP | 1 535 824 | 6/2005 |
| EP | 1 547 902 | 6/2005 |
| EP | 1 553 002 | 7/2005 |
| FR | 2 729 361 | 7/1996 |
| GB | 2 431 980 | 5/2007 |
| JP | 10-7003 | 1/1998 |
| JP | 2002-302046 | 10/2002 |
| JP | 2004-161276 | 6/2004 |
| JP | 2004-196299 | 7/2004 |
| JP | 2010-234907 | 10/2010 |
| JP | 2011-25859 | 2/2011 |
| KR | 10-2012-0042328 | 5/2013 |
| WO | 01/81149 | 11/2001 |
| WO | 2007/026114 | 3/2007 |
| WO | 2009/121386 | 10/2009 |
| WO | 2009/138578 | 11/2009 |
| WO | 2011/070950 | 6/2011 |
| WO | 2013/056764 | 4/2013 |
| WO | 2013/056765 | 4/2013 |
| WO | 2013/056771 | 4/2013 |

* cited by examiner

STEERING COLUMN FOR A MOTOR VEHICLE

BACKGROUND OF THE INVENTION

The present invention relates to a steering column for a motor vehicle comprising a bracket part for securing in position the steering column on a body of the motor vehicle and a steering shaft bearing unit for the rotatable bearing support of a steering shaft and supported between at least two side jaws of the bracket part. Between the side jaws of the bracket part and the steering shaft bearing unit a bearing part is disposed, and a clamp bolt of the steering column penetrates the side jaws of the bracket part and the bearing part and the steering shaft bearing unit. The bearing part comprises at least one bearing part bead, the steering shaft bearing unit comprises at least one steering shaft bearing unit bead, and the bearing part bead is at least regionally areally in contact on the steering shaft bearing unit bead.

Generic steering columns are known within prior art. The structure of the bracket part, steering shaft bearing unit, and bearing part disposed therebetween is frequently employed in so-called adjustable steering columns, which enable the adaption of the position of the steering wheel to the particular vehicle driver.

Generic steering columns are disclosed, for example in WO 2009/121386 A1 and U.S. Pat. No. 7,918,483. Building on this prior art, the present invention addresses the problem of providing a simple and cost-effective generic steering column in which high demands made of rigidity and/or intrinsic frequency are met at low cost.

SUMMARY OF THE INVENTION

According to the invention, the clamp bolt penetrates the bearing part in the bearing part bead and the steering shaft bearing unit in the steering shaft bearing unit bead.

The steering column according to the invention can advantageously be implemented such that it can be set in its height, which is identical to inclination, and/or in its length. Preferred are generally cost-effective height and length adjustable steering columns which comprise a securement device that makes possible the optional enabling (=open state of the securement device) or fixing (=closed state of the securement device) of the particular displacement direction. As a part of such a securement device, the clamp bolt, together with further clamping parts, such as for example a tightening piece, a cam plate or a clamping nut, can herein serve in simple manner for the optional enabling or fixing of the feasible adjustment in length directions and/or height direction, depending on the realization. Independently of fixing under form closure or force closure (also friction closure), it is always advantageous for high pressing forces to be applied in the closed state of the securement device onto the connections between steering shaft bearing unit and bearing part, on the one hand, and bearing part and bracket part, on the other hand.

The clamp bolt penetrates through steering shaft bearing unit bead and bearing part bead, so that the tightening forces exerted by the clamp bolt are directly transmitted to both beads. Therefore, using a simple construction, high forces can be transmitted and high rigidity is attained. The rigidity can herein be further increased if the bearing part and the steering shaft bearing unit on the surfaces oriented parallel to the two side jaws comprise on both sides of the steering shaft correspondingly one steering shaft bearing unit bead and one bearing part bead each which are penetrated by a clamp bolt. This also aids in reducing the number of structural parts and/or the material utilization for the production of the steering column. In the open state, in which no or only minimal tightening forces are transmitted via the clamp bolt, through the assembly according to the invention a low-play guiding system is attained without large expenditures. To the driver of the motor vehicle, consequently, a stable and full sensation is conveyed when handling the steering wheel attached on the steering shaft of the steering column. The bearing part bead and the steering shaft bearing unit bead are advantageously developed such that they correspond to one another. In these terms, it is preferably also provided that the bearing part bead is developed, viewed in a sectional plane through a longitudinal center axis of the clamp bolt, geometrically similar to the steering shaft bearing unit bead. It is further also advantageous if the bearing part bead and/or the steering shaft bearing unit bead is or are developed axisymmetrically with respect to a longitudinal center axis of the clamp bolt. It is herein conceivable and feasible to develop the bearing part bead as two or several sectionally discontinuous bead sections which engage into the steering shaft bearing unit bead.

It is advantageous if the side walls of the beads are each in contact, preferably in pairs, on one another. However, in order to be able to transmit especially high tightening forces in the axial direction, preferred embodiments of the invention provide that both the bearing part bead and the steering shaft bearing unit bead comprise side walls and a bead base connecting the side walls with one another. Especially advantageous is the development of side walls in the particular beads that are inclined in the range of 30° to 60°, preferably 45° to 60°, with respect to the bead base. In the closed state of the securement device, the bearing part bead and the steering shaft bearing unit bead are, preferably pairwise, under prestress with their side walls in contact on one another. The clamp bolt is advantageously guided through an opening in the particular bead base.

The development of the bead base in the bearing part bead as well as also in the steering shaft bearing unit bead oriented parallel, or at least nearly parallel, with respect to one another enables the compensation of tolerances with their side walls with the simultaneous increase of the contact tension in the contact between the side walls of the two beads. In this case, the two bead bases are not in contact with one another in the closed state of the securement device. However, alternatively, it is also conceivable and feasible with the restriction of the tolerance, to provide this contact between the particular bead bases to be straight or linear, wherein also a considerable pressing force increase onto the contact between the side walls is enabled.

Developing the additional bearing part offers a number of advantages in the production of the steering column. Using a simple 'same parts' strategy it becomes feasible to produce not only non-adjustable but also only length adjustable or also, alternatively, only height adjustable or length-adjustable and height-adjustable steering columns. Herein, only the bearing part has to be varied. It becomes simultaneously feasible to produce different steering columns with different structural lengths or a different spacing of the securement points in the motor vehicle using a 'same parts' strategy. It is also feasible, using a multiplicity of same parts, to produce a steering column with an electric power assistance device for providing a booster force and/or an auxiliary steering angle. With the teaching according to the invention, it suffices to adapt the bearing part to the requirements. With the aid of the teaching according to the invention, it was unexpectedly possible to produce a steering column that comprises the steering shaft bearing unit, the bracket part and the bearing part, which also fulfils the high demands made of rigidity.

In case the steering column is only adjustable in the length direction, it can additionally be provided to provide also in one, preferably both, side jaws of the bracket part a bead, the bracket part bead or bracket part beads, corresponding to the beads in the steering shaft bearing unit and to the bead in the bearing part. This bead also advantageously comprises side walls. The above described explanations regarding the cooperation and the geometric formation of the beads are also analogously applicable to the one or the two bracket part bead or beads.

By guiding the clamp bolt through the bearing part bead, the steering shaft bearing unit bead, and optionally also the bracket part bead, an extremely compact construction method can be achieved. Through the measures according to the invention, the clamp bolt can be disposed in close proximity to the steering shaft bearing unit and in particular to the steering shaft rotatably supported therein. Through the development of the beads in the steering shaft bearing unit, it becomes possible to implement the steering shaft bearing unit such that between the clamp bolt and the steering shaft no intermediate wall is required. This leads in equal measure to a compact as well as also stable construction method. In addition, the forces transmitted via the clamp bolt act very directly onto the beads.

The bolt penetrates centrally the bearing part bead and the steering shaft bearing unit bead, as well as the optionally provided bracket part bead, which is further advantageous for a symmetric force introduction distributed onto all side walls of the particular beads. The bead base advantageously has a width such that the clamp bolt can be guided completely through an opening in the bead base. The bead base can still comprise further regions lateral to the openings, with which regions it is braced on the bead bases of the other beads. The openings or cutouts in the beads or bead bases through which the clamp bolt is guided should advantageously be greater than the diameter of the clamp bolt such that the clamp bolt is not in direct contact on the margins of the openings or cutouts. This has the advantage that during an adjustment, the clamp bolt is not in direct contact on the margin of the openings or cutouts, and that, in the event of a motor vehicle crash, no rotational movement of the clamp bolt is triggered.

For the sake of completeness, reference is made to the fact that the steering shaft bearing unit bead is a bead in the steering shaft bearing unit, the bearing part bead is accordingly a bead in the bearing part, and the bracket part bead, again, accordingly a bead in the bracket part. As is generally known, a bead is a channel-like indentation or grooving. Geometrically similar are two beads if they can be transformed one into the other through similarity mapping, e.g. a geometric mapping that can be combined from centric elongations and congruence mapping such as shifting, rotation or mirroring.

It is conceivable and feasible in terms of the invention to develop the beads as so-called inner beads or also as outer beads. The beads are preferably developed as so-called inner beads since in this case a simpler construction leads to a correspondingly stable steering column. Especially preferably by inner bead is to be understood in terms of the invention a bead whose base is recessed approximately perpendicularly to the plane of the side jaws in the direction toward the steering shaft, wherein the base extends substantially parallel to the plane of the side jaws. Hereby, a compact construction method is attained. In addition, high forces can also be transmitted. It is consequently advantageous in these terms for the bearing part bead and the steering shaft bearing unit bead, and, if provided, also the bracket part bead, to be developed as beads recessed in the direction toward the region between the side jaws of the bracket part. In terms of an advantageous force transmission as effective as possible, preferred variants provide furthermore that the bearing part bead on two opposing sides of the clamp bolt is at least regionally areally, or alternatively at least regionally in the form of a line, in contact on the steering shaft bearing unit bead. In terms of low-play guidance and the capability of being able to absorb high forces even in the event of a crash, especially preferred embodiments of the invention provide that the bearing part bead and/or the steering shaft bearing unit bead and/or the optionally provided bracket part bead is or are implemented such that they extend in the longitudinal direction. Hereby, an especially great guidance length which effects an advantageous force bracing under torque loading, such as occurs for example in the event of a crash, is provided.

It is preferable that the side jaws of the bracket part each comprise at least one bracket part bead and that the clamp bolt penetrates the side jaws in the bracket part bead, and the bracket part bead, preferably on two opposing sides of the clamp bolt, is at least regionally areally in contact on the bearing part bead.

It is furthermore advantageous if the bearing part bead and the steering shaft bearing unit bead and, as far as provided, also the bracket part bead each comprise side walls and a bead base connecting the side walls with one another. The bearing part bead and the steering shaft bearing unit bead and, as far as provided, also the bracket part bead, are in contact, preferably pairwise, on one another with their side walls preferably at least in the closed state of a securement device of the steering column, with which state the steering shaft bearing unit is fixed in its position with respect to the bracket part.

Especially preferred embodiments of the invention provide that the bearing part is formed unitarily, for example of a curved, preferably curved in the shape of a U, strip of sheet metal. This strip can comprise two bearing part flanks, in each of which one bearing part bead is developed, and a bearing part base, wherein the bearing part base is preferably oriented in the direction of the front side of the steering column. The open end of the U-shaped part is preferably oriented in the direction of the steering wheel adapter of the steering column. Viewed in cross section to the longitudinal axis of the steering shaft, the steering shaft bearing unit, on the two sides which extend approximately parallel to the side jaws of the bracket unit, is advantageously encompassed between the bearing part flanks Through the bead construction according to the invention, an additional bracing of the steering shaft bearing unit can be omitted outside of the bearing part beads in the bearing part, for example through a face disposed inclined at an angle with respect to the side jaws on the bearing part flanks Thereby the weight of the steering column can be reduced and material can be saved. Furthermore, it becomes thereby feasible that additional elements, such as for example an anti-theft device, disposed on the steering shaft bearing unit, can be guided past the bearing part. This is especially of advantage during a crash. In terms of a stable bearing, the bearing part comprises at least two securement sites, spaced apart from one another, at which it can be secured directly or indirectly on a mounting of the body of the motor vehicle. In these terms, a preferred embodiment of the invention provides that the bearing part at least at one site, spaced apart from the clamp bolt, comprises a fixed bearing part securement or one such forming a swivel joint for the securement of the bearing part on the body of the motor vehicle or on the bracket part. The bearing part securement can herein be reinforced or rigidified. The bearing part securement is with advantage disposed in the proximity of the bearing part base. The clamp bolt penetrates the bearing part flanks with advantage in the proximity of the open end of the U-shaped part. In terms of a bearing as stable and low-play as is possible, it is advantageous if the distance between clamp bolt and bearing part securement corresponds at least to half, preferably at least to three-fourths, of the length of the bearing part.

The bearing part is advantageously characterized in that the bearing part comprises precisely two bearing part flanks which are connected with one another by means of a bearing part flank connection and are longitudinally extended in a direction parallel to the longitudinal extent of the steering shaft, wherein the steering shaft bearing unit is disposed between the bearing part flanks In this manner, the steering shaft bearing unit is advantageously, viewed in cross section to the center longitudinal axis, encompassed precisely on two sides by the bearing part. Herein, advantageously, viewed in an operating position of the steering column, in the bearing part the extent of the bearing part flanks in the vertical direction is less than the extent of the steering shaft bearing unit. The bearing part advantageously is characterized in that the bearing part has preferably a U-shape formed by the bearing part flanks and the bearing part flank connection. The bearing part is advantageously characterized in that preferably in at least one, however preferably in each, of the bearing part flanks is disposed one of the bearing part beads. The bearing part flank connection can also assume further functions or be formed by structural parts or assemblies which are provided for constituting further functions in the steering system.

Preferred variants of the invention are implemented as so-called adjustable steering columns. For example, the bearing part, to provide height adjustability of the steering column, can be swivellably supported. Further, the steering shaft bearing unit, to provide length adjustability of the steering column, can be supported in the bearing part such that it is displaceable in the longitudinal direction of the steering shaft. Especially preferred embodiments of steering columns according to the invention are height adjustable as well as also length adjustable. They consequently comprise a combination of the last listed features. For the sake of completeness, however, reference is made to the fact that steering columns according to the invention can also be so-called rigid steering columns which offer none of the adjustment capabilities. Here, the clamp bolts can simply assume a mounting function.

It must also be taken into consideration that the features according to the invention of the steering column can not only be employed in order to attain an adjustable steering column that is as low-play as feasible. Rather, the penetration of the beads by the clamp bolt can also be utilized for the purpose of attaining an energy absorption device for the rigid or also adjustable steering column thereby that the beads are implemented as crash beads known per se that are reformed in the event of a crash. Through the implementation of the beads, in the event of a crash, a skidding-through via the bead guidance can be enabled for the purpose of energy absorption. In adjustable steering columns, in which the beads are additionally also implemented as crash beads, the regions of the beads relevant for energy conversion in the event of a crash are advantageously located at the end of the displacement path for the steering column adjustment.

The shape of the beads can, in a simple manner, be configured such that end stops for delimiting the range of the adjustment are developed. This can simply be attained through recurved ears or decreased depths of the steering shaft bearing unit bead or knob-like projections or additional elements in one of the beads.

BRIEF DESCRIPTION OF THE DRAWINGS

Further features and details of preferred embodiments of the invention will be explained in conjunction with the following description of the drawings, in which.

DETAILED DESCRIPTION OF THE INVENTION

Figure 1:
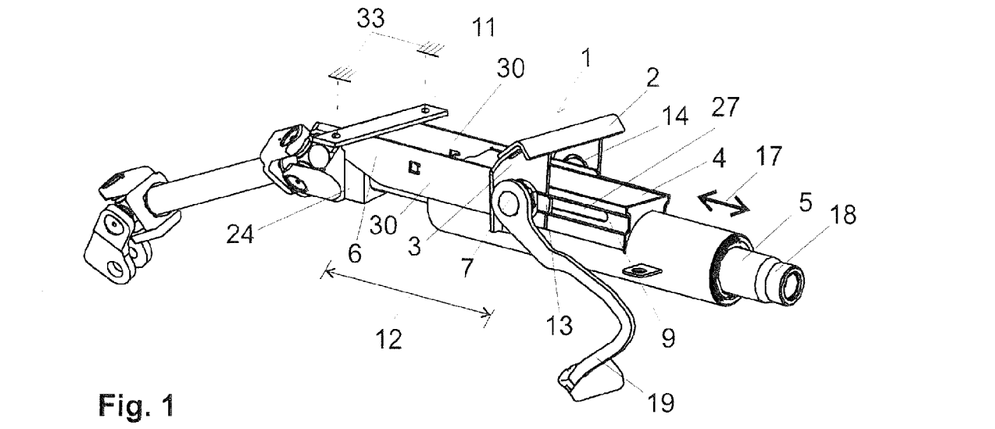
FIGS. 1 and 2 show a first embodiment according to the invention in the form of a length adjustable steering column.
Figure 2:
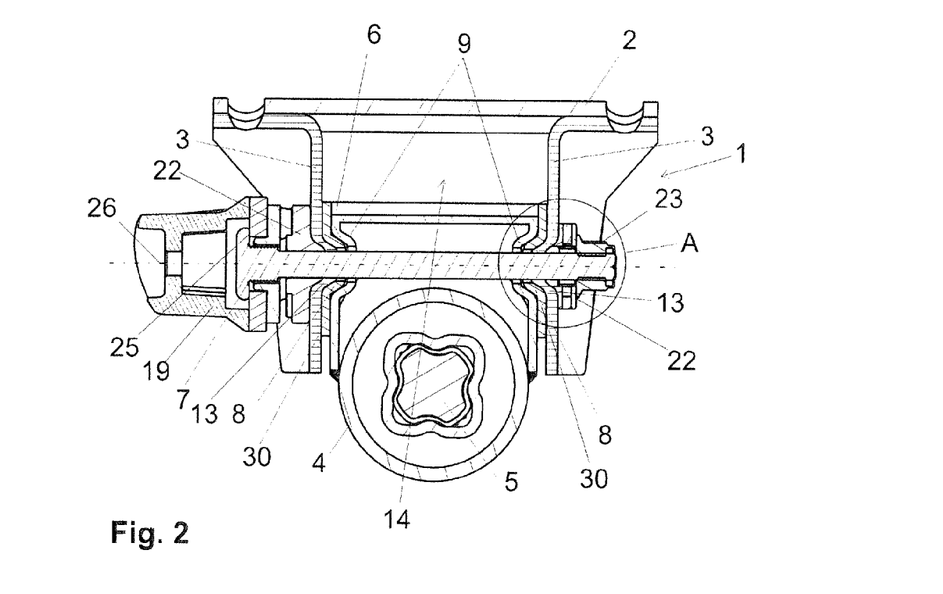

FIG. 1 depicts a first steering column 1 according to the invention. Due to the bracket part 2, this column can be secured on mountings 33 of a body of a motor vehicle, not depicted here. FIG. 2 shows a vertical section through this steering column 1 along a clamp bolt 7. In particular, FIG. 2 shows especially clearly that the bracket part 2 comprises two side jaws 3 between which the steering shaft bearing unit 4 is retained. In the steering shaft bearing unit 4, the steering shaft 5 is rotatably supported. The steering wheel adapter 18 of the steering shaft 5 is provided for the securement of a steering wheel, not shown here, on the steering shaft 5. Between the side jaws 3 and the steering shaft bearing unit 4 are located bearing part flanks 30 of the bearing part 6. At the end facing away from the clamp bolt 7 is securable the bearing part 6 by means of the bearing part securement 11, in the depicted embodiment on a mounting 33 of the body, not shown here, of the motor vehicle. Embodiments are also conceivable in which the bearing part securement 11 is secured on the bracket part 2. In the depicted embodiment, the bearing part securement 11 is in any case implemented such that it is rigid. The length of the bearing part 6 is provided in the drawing with the reference number 12. As already explained in the introduction, it is advantageous if the bearing part securement 11 is spaced as far away from the clamp bolt 7 as is feasible. For this purpose, as already explained, the distance between clamp bolt 7 and bearing part securement 11 should be at least half, preferably at least three fourths, of the length 12 of the bearing part 6.

The depicted embodiment according to FIGS. 1 and 2 is a length adjustable steering column 1. The displacement directions are marked by a double arrow 17. This corresponds to the longitudinal direction of the steering shaft 5.

Figure 3:
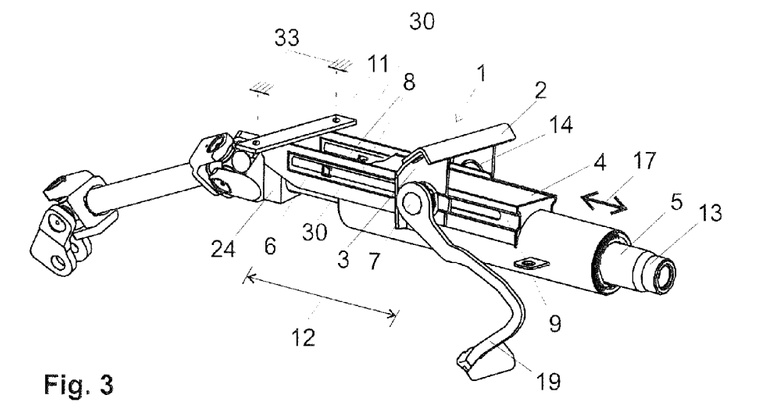
FIG. 3 shows a minimally modified physical form of the first embodiment.
Figure 7:
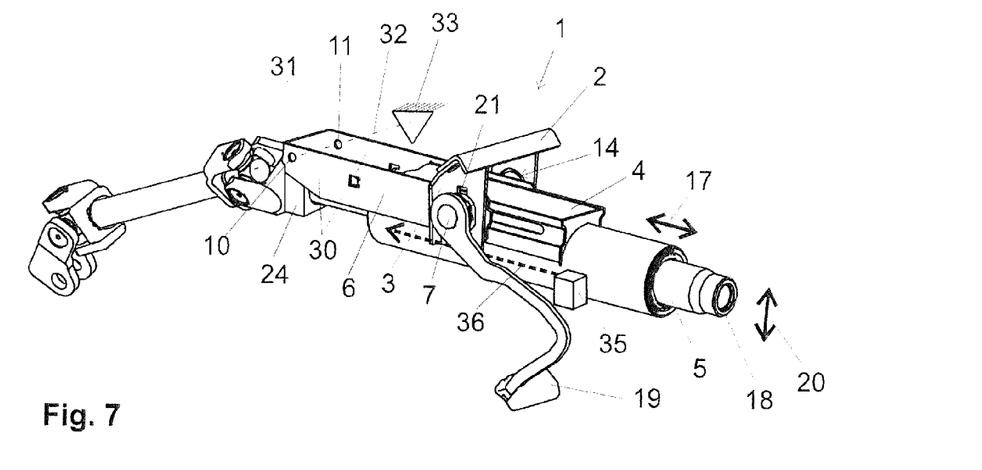

In the depicted embodiment, the steering shaft 5, which here is telescopable, is rotatably supported in the front region in the proximity of the bearing part securement in a steering shaft bearing 24. Depending on implementation, however, such a steering shaft bearing 24 can be omitted. As an illustration, such bearings are depicted in FIGS. 1, 3 and 7. As is evident in the Figures, the use of this steering shaft bearing 24 is feasible independently of the implementation of further variants. In order, on the one hand, to permit the displacement in the longitudinal direction 17, however, on the other hand, to ensure during operation sufficiently strong securement of the steering shaft bearing unit 4 on the bracket part 2, in this steering column, as is known per se, a securement device is provided which, inter alia, encompasses the clamp bolt 7 and the actuation lever 19. It is understood that motor-driven actuations of the securement device are also conceivable. In such cases, the actuation lever 19 can subsequently be omitted. Securement devices with a clamp bolt 7 for adjustable steering columns 1 are known within the prior art in a multiplicity of embodiments. The embodiments depicted here serve only as illustration of one of many different feasible variants of the manner of tightening and releasing the securement device.

In the depicted embodiment, a cam plate 25 is connected torque-proof with the actuation lever 19. The cams of this cam plate 25 cooperate with corresponding countercams of the tightening piece 22. The tightening piece 22 can be connected torque-proof with the bracket part 2. On the opposite side, the clamp bolt 7 is fixed with a clamping nut 23. Here is also located a tightening piece 22 which can also be developed as an axial needle bearing or axial ball bearing that is disposed between clamping nut 23 and the corresponding side jaw 3 of the bracket part 2. By turning the actuation lever 19 about the center longitudinal axis 26 of the clamp bolt 7, the cam plate 25 is turned against the tightening piece 22 adjacent thereto. Depending on the position of the involved cams with respect to one another, the securement device is subsequently in the closed state in which the steering shaft bearing unit 4 is fixed on the bracket part 2 at least at the forces occurring in normal operation. Through the appropriate rotation of the actuation lever 19, the securement device can subsequently be brought into the open state in which a displacement in the longitudinal directions 17 of the steering shaft bearing unit 4 relative to the bracket part 7, and therewith a setting of the position of the steering wheel, is enabled. Such securement devices are known per se and do not need to be further explained here. As is especially clearly evident in the sectional representation according to FIG. 2, the bearing part 6, in the bearing part flanks 30, as well as also the steering shaft bearing unit 4 have each beads with which they are supported one in the other. In the first embodiment, the particular bearing part bead 8 is guided in one of the steering shaft bearing unit beads 9. In the depicted first embodiment according to FIGS. 1 and 2, the bracket part 7 additionally also comprises on both side jaws 3 one bracket part bead 13 which, in the depicted embodiment, engages into one of the bearing part beads 8. The clamp bolt 7 is guided according to the invention through the bearing part beads 8 and the steering shaft bearing unit beads 9. In the depicted embodiment, the guide bolt 7 is additionally also guided through the bracket part beads 13.

As can be seen especially well in FIG. 2, it is advantageous if, as in this embodiment also realized, the beads are implemented as so-called inner beads. This is the case if they are implemented such that they are recessed in the direction into the region 14 between the side jaws 3 of the bracket part 2.

Figure 8:
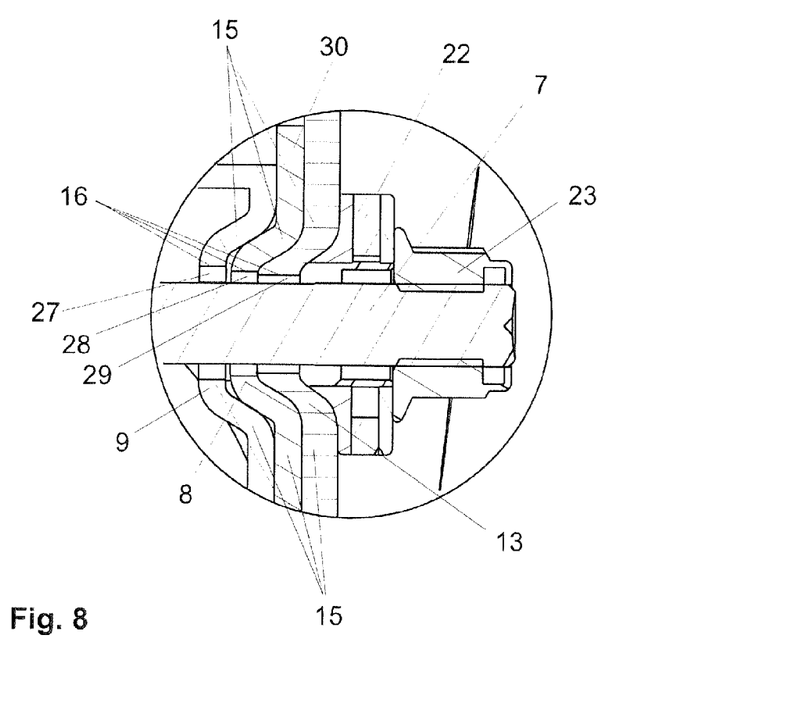
FIG. 8 shows the segment A from FIG. 2 in an enlarged depiction.
Figure 9:
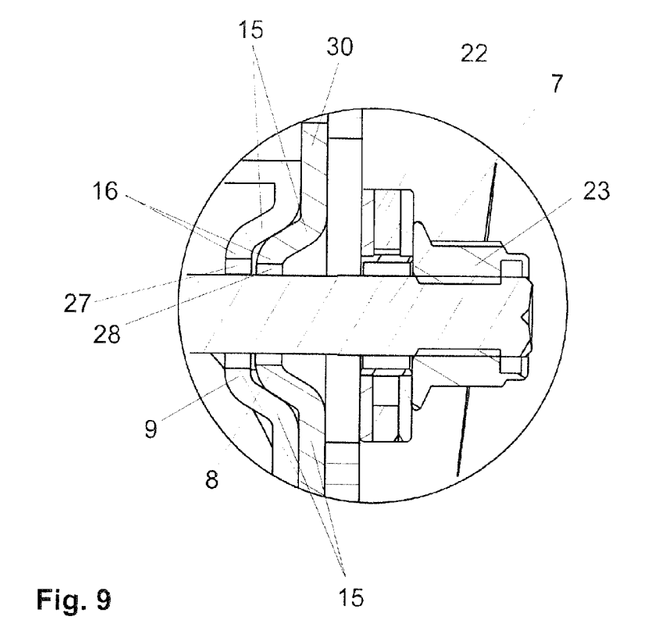
FIG. 9 shows segment B from FIG. 5.

Region A from FIG. 2 is once again depicted in FIG. 8 at an enlargement. It can here be seen especially well that each of the beads 6, 9 and 13 comprises two side walls 15 which are connected with one another by a bead base 16. The clamp bolt 7 penetrates in each instance the bead base 16 of the beads 8, 9 and 13. The cutout or opening necessary for this purpose is advantageously only large enough for there still to be lateral margins of the bead base 16.

This enables greater rigidity in the contact of the corresponding beads since thereby, in the direction of the center longitudinal axis 26 of the clamp bolt 7, forces can be transmitted especially well. The side walls 15, and here also the bead bases 16 of the particular adjacent beads 8, 9 and 13, are fully in areal contact on one another. They are symmetric with respect to the center longitudinal axis 26 of clamp bolt 7 and, in terms of optimal contact on one another, have a geometrically similar form. In the depicted embodiment, the tightening pieces 22, engaging from the outside into the bracket part beads 13, comprise projections formed out corresponding to the bead indentation, with which they engage into the bracket part beads 13. By guiding the clamp bolt 26 directly through the beads 8, 9, and here also 13, the clamping forces of the clamp bolt 7 act directly onto the beads whereby a simple as well as also effective construction method and force transmission is realized. It should, furthermore, be pointed out that through this construction a highly compact construction method is feasible thereby that the distance between the clamp bolt 7 and the steering shaft 5 can be kept very short.

In the first embodiment, the steering shaft bearing unit beads 9 have each an elongated hole 27 through which the clamp bolt 7 is guided. Through this longitudinally extending elongated hole 27 extending in the longitudinal direction 17 of the steering shaft 5 it becomes feasible to displace the steering shaft bearing unit 4 in the longitudinal directions 17 relative to the bracket part 2.

The elongated hole 27 is advantageously wider in the steering shaft bearing unit 4 than the diameter of hole 28 in the bearing part 6. The diameter of hole 29 in the bracket part 2 is advantageously smaller than the diameter of hole 28 in the bearing part 6. In this way, the abrasion can be reduced. It is also conceivable and feasible for the production of a greater displacement length to implement the hole 29 as an elongated hole. In that case, instead of the diameter of hole 29, the width of the elongated hole would have to be assessed as the measure of the above comparisons.

In the first embodiment, the bearing part beads 8 and the bracket part beads 13 are not developed such that they extend longitudinally. Through the longitudinal extent 12 of the bearing part 6 and the disposition of the bearing part securement 11, remote from the clamp bolt 7, in the longitudinal direction 17, a highly torsion-resistant and low-play bearing of the steering shaft bearing unit 4 is attained. Yet the torsion resistance of the construction can still be further increased thereby that, in a modification of the first embodiment, such as is depicted in FIG. 3, the bearing part beads 8 also are longitudinally extended. The engagement of the bearing part beads 8 into the steering shaft bearing unit beads 9 is markedly extended in the longitudinal direction 17 which further increases the torsion resistance of the overall construction. In FIG. 3 the steering shaft bearing 24 is additionally depicted.

Figure 4:
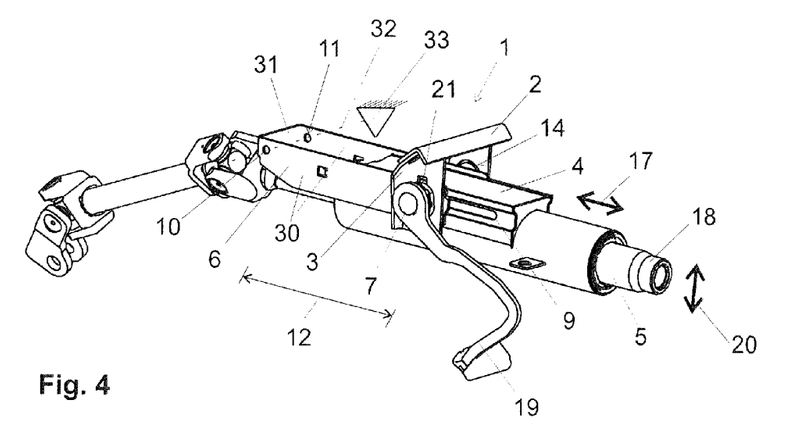
FIGS. 4 and 5 shows a further steering column implemented according to the invention, which is height and length adjustable.
Figure 5:
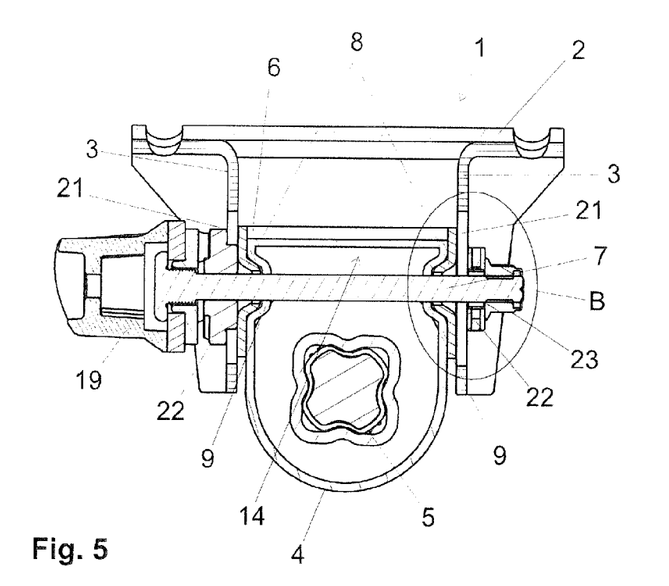

Before discussing the embodiment according to FIGS. 4 and 5, reference should be made to the fact that in all of the embodiments shown the particular bead configurations are realized bilaterally, thus on both side jaws 3 of the bracket part 2. This is advantageous in terms of a low-play rigid structure. However, it is not absolutely necessary. It would also be conceivable to realize the corresponding bead configurations on only one of the side jaws 3, wherein it is, however, necessary to ensure according to the invention that the clamp bolt 7, nevertheless, penetrates the particular beads.

In the embodiment according to FIGS. 4 and 5, in addition to the length adjustability of the steering column 1 in the longitudinal direction 17, a height adjustability of this steering column 1 in the height directions 20 is also provided. For this purpose in this embodiment in each of the two side jaws 3 of the bracket part 2, a vertically extending elongated hole 21 is disposed in which the clamp bolt 7 is disposed such that it is longitudinally displaceable. Height as well as also length adjustment, however, are only possible when the securement device is in its open state. In the closed state of the securement device these adjustment capabilities are not given, at least not under the forces occurring during normal operation.

Also depicted in FIG. 5 is a variant in which in the steering shaft bearing unit 4 there is no wall between the clamp bolt 7 and the steering shaft 5. The clamp bolt 7 can thereby be guided very closely past the steering shaft 5. The region of the steering shaft bead unit, which includes the steering shaft bearing unit beads, can either be fabricated separately and joined, in particular welded, to the steering shaft bearing unit or the steering shaft bearing unit can be correspondingly implemented unitarily.

In order to be able to realize the height adjustability in the height directions 20 also, in the embodiment according to FIGS. 4 and 5, the bearing part securement 11 of bearing part 6 comprises a swivel joint 10. The bearing part 6, together with the steering shaft bearing unit 4, can be swivelled about this swivel joint 10 about a swivel axis 32 when a height adjustment is carried out. A further difference from the first embodiment is that in this variant a bracket part bead is omitted on both side jaws 3. The elongated holes 21 are provided in the side jaws on both sides. The tightening pieces 22 in this embodiment accordingly also do not comprise noses with which they would engage into the beads. It is nevertheless provided according to the invention that the bearing part beads 8 are in contact in the steering shaft bearing unit beads 9 and that the clamp bolt 7 penetrates through these beads. Apart from these differences, the embodiment according to FIGS. 4 and 5 is substantially implemented like the first embodiment such that additional explanations in this regard are not necessary.

Figure 6:
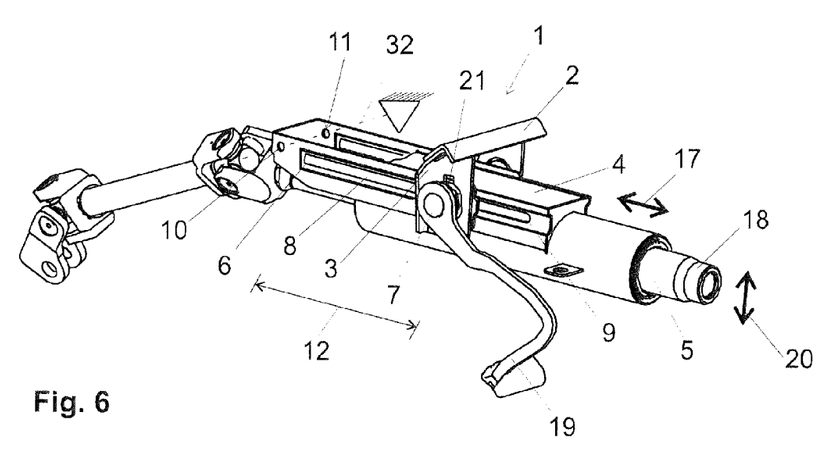
FIGS. 6 and 7 show two different modification forms of this further embodiment according to the invention according to FIGS. 4 and 5.

FIG. 6 shows a modified embodiment of the embodiment according to FIGS. 4 and 5 in which here, again, the bearing part beads 8 are also developed extending longitudinally in the longitudinal direction 17. The effect attainable hereby is the same as in the variant according to FIG. 3.

FIG. 7 shows a modification of the embodiment such as is depicted in FIG. 4, in which a steering shaft bearing 24 is provided in the proximity of the swivel axis 32. In this depiction, further, a steering wheel lock 35 is also illustrated schematically, which can also be included in all other embodiments. The dashed line 36 illustrates the manner in which advantageously the steering wheel lock 35, in particular in the event of a crash, can be moved past the bearing part flanks 30 and the side jaws 3. The crash path can thereby be extended. Furthermore, further additional elements, not shown here, such as for example cover panels or cowling elements together with their mountings, can be carried past the bearing part 6 in the event of a crash.

Figure 10:
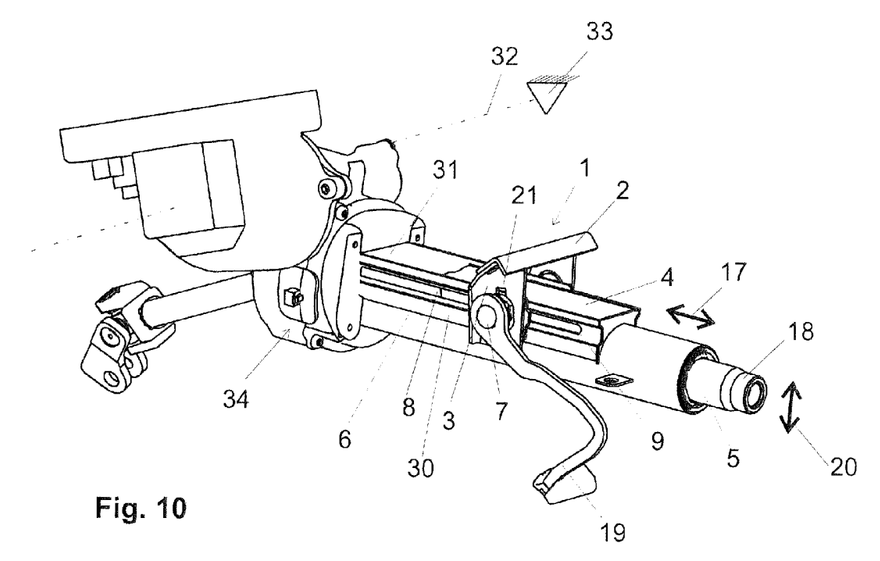
FIG. 10 show embodiments of the invention wherein the steering column comprises a power assistance support.

FIG. 10 depicts a steering column according to the invention which comprises a power assistance device 34, which provides a booster force to relieve torques to be applied by the driver to turn the steering shaft. The bearing part 6 is connected with the housing of the power assistance device, which is secured in a (not shown) swivel joint swivellably about the swivel axis 32 on the mounting 33 of the (not shown) motor vehicle body. Such power assistance devices which, alternatively to or in combination with the introduction of a booster force, also provide an additional steering angle (superimposed steering system) are known in prior art and do not require detailed descriptions here. The connection of the power assistance device with the steering column via the bearing part 6, however, is especially advantageous since with very low expenditures a very rigid configuration is enabled. The combinability of different steering columns with different power assistance devices is highly flexible such that a same-parts strategy can be especially well implemented.

To the extent applicable, all features depicted in the individual embodiments can be freely combined with one another without leaving the scope of the invention.

LEGEND TO THE REFERENCE NUMBERS

1 Steering column
2 Bracket part
3 Side jaws
4 Steering shaft bearing unit
5 Steering shaft
6 Bearing part
7 Clamp bolt
8 Bearing part bead
9 Steering shaft bearing unit bead
10 Swivel joint
11 Bearing part securement
12 Length
13 Bracket part bead
14 Region
15 Side wall
16 Bead base
17 Longitudinal direction
18 Steering wheel adapter
19 Actuation lever
20 Height direction
21 Elongated hole
22 Tightening piece
23 Clamping nut
24 Steering shaft bearing
25 Cam plate
26 Center longitudinal axis
27 Elongated hole
28 Hole
29 Hole
30 Bearing part flank
31 Bearing part base
32 Swivel axis
33 Mounting
34 Power assistance device
35 Steering wheel lock

The invention claimed is:

1. A steering column for a motor vehicle comprises: a bracket part for securing the steering column on a body of a motor vehicle; and a steering shaft bearing unit, bearing supported between at least two side jaws of the bracket part for the rotatable support of a steering shaft of the steering column; wherein a bearing part is disposed between the side jaws of the bracket part and the steering shaft bearing unit, and a clamp bolt of the steering column penetrates the side jaws of the bracket part and the bearing part and the steering shaft bearing unit, and the bearing part comprises at least one bearing part bead and the steering shaft bearing unit comprises at least one steering shaft bearing unit bead, and the bearing part bead is at least regionally areally in contact on the steering shaft bearing unit bead, wherein the clamp bolt penetrates the bearing part in the bearing part bead and the steering shaft bearing unit in the steering shaft bearing unit bead.

2. The steering column as in claim 1, wherein the bearing part comprises at least one bearing part securement at a site spaced apart from the clamp bolt and forming a fixed securement joint or a swivel joint for securing the bearing part the body of the motor vehicle or on the bracket part.

3. The steering column as in claim 2, wherein the distance between the clamp bolt and the bearing part securement corresponds at least to half of the length of the bearing part.

4. The steering column as in claim 1, wherein the side jaws of the bracket part each comprise at least one bracket part bead, and the clamp bolt penetrates the side jaws in the bracket part bead, and the bracket part bead, is at least regionally areally in contact on the bearing part bead (8).

5. The steering column as in claim 4, wherein the bearing part bead, the steering shaft bearing unit bead, and the bracket part bead, are implemented as beads recessed in the direction into the region between the side jaws of the bracket part.

6. The steering column as in claim 1, wherein the bearing part bead on two opposing sides of the clamp bolt is at least regionally areally in contact on the steering shaft bearing unit bead.

7. The steering column as claim 1, wherein at least one of the group consisting of the bearing part bead, the steering shaft bearing unit bead, and a bracket part bead is implemented extending longitudinally.

8. The steering column as in claim 1, wherein the steering shaft bearing unit for providing length adjustability of the steering column is supported such that it is displaceable in the longitudinal direction of the steering shaft.

9. The steering column as in claim 1, wherein the bearing part for providing height adjustability of the steering column is supported such that it is swivellable.

10. The steering column as in claim 1, wherein the bearing part bead and the steering shaft bearing unit bead each comprise side walls and a bead base connecting the side walls with one another, wherein the bearing part bead and the steering shaft bearing unit bead contact one another with their side walls.

11. The steering column as in claim 3, wherein the distance between the clamp bolt and the bearing part securement corresponds at least to three-fourths of the length of the bearing part.

12. The steering column as in claim 4, wherein the side jaws of the bracket part each comprise at least one bracket part bead, and the clamp bolt penetrates the side jaws in the bracket part bead, and the bracket part bead is at least regionally areally in contact on the bearing part bead on two opposing sides of the clamp bolt.

13. The steering column as in claim 1, wherein the bearing part bead and the steering shaft bearing unit bead are implemented as beads recessed in the direction into the region between the side jaws of the bracket part.

14. The steering column as in claim 1, wherein the bearing part bead on two opposing sides of the clamp bolt is at least regionally in the form of a line in contact on the steering shaft bearing unit bead.

15. The steering column as in claim 4, wherein the bearing part bead, the steering shaft bearing unit bead, and the bracket part bead each comprise side walls and a bead base connecting the side walls with one another, wherein the bearing part bead, the steering shaft bearing unit bead, and the bracket part bead contact one another with their side walls.

16. The steering column as in claim 15, wherein the bearing part bead, the steering shaft bearing unit bead, and the bracket part bead pairwise contact one another with their side walls at least in the closed state of a securement device of the steering column with which the steering shaft bearing unit is fixed in its position with respect to the bracket part.

17. The steering column as in claim 10, wherein the bearing part bead and the steering shaft bearing unit bead pairwise contact one another with their side walls at least in the closed state of a securement device of the steering column with which the steering shaft bearing unit is fixed in its position with respect to the bracket part.

* * * * *